United States Patent [19]
Pakulski

[11] Patent Number: 6,025,302
[45] Date of Patent: Feb. 15, 2000

[54] QUATERNIZED POLYETHER AMINES AS GAS HYDRATE INHIBITORS

[75] Inventor: Marek K. Pakulski, The Woodlands, Tex.

[73] Assignee: BJ Services Company, Houston, Tex.

[21] Appl. No.: 09/081,160

[22] Filed: May 18, 1998

[51] Int. Cl.[7] .............................. C09K 3/00; C07C 9/00
[52] U.S. Cl. .............................. 507/90; 585/15; 585/950
[58] Field of Search .............................. 507/90; 585/15, 585/950

[56] References Cited

U.S. PATENT DOCUMENTS

| | | | |
|---|---|---|---|
| 4,384,951 | 5/1983 | McCoy et al. | 208/188 |
| 4,420,414 | 12/1983 | Valone | 252/392 |
| 4,424,866 | 1/1984 | McGuire | 166/303 |
| 4,456,067 | 6/1984 | Pinner, Jr. | 166/279 |
| 4,547,304 | 10/1985 | McEntire et al. | 252/79.1 |
| 4,564,372 | 1/1986 | Campbell | 44/387 |
| 4,581,151 | 4/1986 | Campbell | 508/462 |
| 4,589,434 | 5/1986 | Kelley | 137/1 |
| 4,597,779 | 7/1986 | Diaz | 95/153 |
| 4,602,920 | 7/1986 | Diaz et al. | 95/153 |
| 4,660,645 | 4/1987 | Newlove et al. | 166/304 |
| 4,678,558 | 7/1987 | Belluteau et al. | 208/390 |
| 4,804,485 | 2/1989 | Carroll et al. | 507/246 |
| 4,883,580 | 11/1989 | Roling et al. | 208/48 AA |
| 4,915,176 | 4/1990 | Sugier et al. | 166/371 |
| 4,973,775 | 11/1990 | Sugier et al. | 585/15 |
| 5,076,364 | 12/1991 | Hale et al. | 166/310 |
| 5,154,857 | 10/1992 | Durrieu et al. | 208/188 |
| 5,171,420 | 12/1992 | Forester | 208/48 AA |
| 5,260,268 | 11/1993 | Forsberg et al. | 507/133 |
| 5,331,105 | 7/1994 | Duncum et al. | 585/800 |
| 5,351,756 | 10/1994 | Minkkinen et al. | 166/267 |
| 5,371,244 | 12/1994 | Blytas | 549/378 |
| 5,420,370 | 5/1995 | Sloan, Jr. | 585/15 |
| 5,426,258 | 6/1995 | Thomas et al. | 585/15 |
| 5,432,292 | 7/1995 | Sloan | 585/15 |
| 5,460,728 | 10/1995 | Klomp et al. | 210/698 |
| 5,491,269 | 2/1996 | Colle et al. | 585/15 |
| 5,583,273 | 12/1996 | Colle et al. | 585/15 |
| 5,600,044 | 2/1997 | Colle et al. | 585/15 |
| 5,639,925 | 6/1997 | Sloan et al. | 585/15 |
| 5,648,575 | 7/1997 | Klomp et al. | 585/15 |
| 5,723,524 | 3/1998 | Cohen et al. | 524/376 |
| 5,741,758 | 4/1998 | Pakulski | 507/90 |
| 5,744,665 | 4/1998 | Costello et al. | 585/15 |
| 5,789,635 | 8/1998 | Durand et al. | 585/15 |
| 5,848,644 | 12/1998 | Velly et al. | 166/267 |

FOREIGN PATENT DOCUMENTS

| | | |
|---|---|---|
| WO93/25798 | 12/1993 | WIPO . |
| WO94/12761 | 6/1994 | WIPO . |
| WO95/17579 | 6/1995 | WIPO . |
| WO95/32356 | 11/1995 | WIPO . |
| WO96/08636 | 3/1996 | WIPO . |
| WO96/29502 | 9/1996 | WIPO . |

OTHER PUBLICATIONS

SPE 36588 *Transferability of Kinetic Inhibitors Between Laboratory and Pilot Plant;* J. P. Lederhos and E. D. Sloan, SPE, Colorado School of Mines, Copyright 1996, Society of Petroleum Engineers, Inc. Oct., 1996.

SPE 36742 *Structure H Hydrates: Implication for the Petroleum Industry;* A.P. Mehta and E. D. Sloan, Chemical Engineering Department, Colorado School of Mines, Golden, CO 80401, Copyright 1996, Society of Petroleum Engineers, Inc.

United States Statutory Invention Registration # H1749. "Method for Inhibiting Hydrate Formation" Sep. 1, 1998 Colle et al.

*Primary Examiner*—D. Gabrielle Brouillette
*Assistant Examiner*—LaToya Cross
*Attorney, Agent, or Firm*—Arnold White & Durkee

[57] ABSTRACT

New compositions and methods for inhibiting the formation and/or growth of gas hydrates are described. The compositions are generally polyether ammonium compounds of the formula:

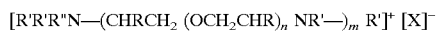

$$[R'R'R''N-(CHRCH_2(OCH_2CHR)_n NR'-)_m R']^+ [X]^-$$

where R=H or $CH_3$;

R'=H or $C_aH_{2a+1}$, where a=1 to 4;

R''=$C_bH_{2b+1}$, where b=4 to 20;

m=1 to 4;

and n=2 to 6.

The anion $[X]^-$ may be freely substituted. Methods for inhibiting the formation and/or growth of gas hydrates involve treating fluid mixtures with the polyether ammonium compounds described.

12 Claims, No Drawings

QUATERNIZED POLYETHER AMINES AS GAS HYDRATE INHIBITORS

FIELD OF THE INVENTION

The present invention relates generally to the use of quaternized polyether amines as gas hydrate inhibitors. Compositions and methods for inhibiting the formation and growth of gas hydrates are provided.

BACKGROUND OF THE INVENTION

Clathrate hydrates are crystalline compounds that occur when water forms a cage-like structure around guest molecules, particularly gaseous molecules. Clathrate hydrates, especially in the petroleum industry, are referred to as gas hydrates, gas hydrate crystals, or simply hydrates. For purposes of this application, these terms will be used interchangeably. In the petroleum industry, gas hydrates pose particular problems with respect to producing, transporting, and processing of hydrocarbons. Typical gas hydrates formed in petroleum (hydrocarbon) environments are composed of water and one or more guest molecules such as methane, ethane, propane, isobutane, normal butane, nitrogen, carbon dioxide, and hydrogen sulfite. It is also known that other guest molecules such as ethylene, nitrous oxide, acetylene, vinyl chloride, ethyl bromide, and oxygen can form clathrate hydrates.

When allowed to form and grow, gas hydrate crystals can become a nuisance at best and pose a serious problem at worst. Gas hydrates can block transmission lines and plug blowout preventers, jeopardize the foundations of deep water platforms and pipelines, collapse tubing and casing, and taint process heat exchangers and expanders. To overcome these problems, several thermodynamic measures are possible in principal: removing free water, maintaining an elevated temperature and/or reduced pressure, or adding freezing point depressants (antifreeze). As a practical matter, adding freezing point depressants has been most frequently applied. Lower alcohols and glycols such as methanol have been added to act as antifreezes. However, in order for such substances to be effective, it is necessary that they be added in substantial amounts, such as 30% by weight of the water present. Not only is this expensive, but it also poses an additional problem since the addition of such large amounts of antifreeze requires recovery prior to further processing of the fluid mixture.

It has been known for some time that in lieu of antifreeze, one can employ a crystal growth inhibitor that inhibits the formation of gas-hydrate crystals and/or the agglomeration of gas hydrate crystallites to large crystalline masses sufficient to cause plugging. Surface active agents such as phosphonates, phosphate esters, phosphonic acids, salts and esters of phosphonic acids, inorganic polyphosphates, salts and esters of inorganic polyphosphates, polyacrylamides, and polyacrylates have been used. It is also known that poly-N-vinyl-2-pyrrolidone (PVP), which is a well-known water-soluble polymer, is effective, in relatively low concentrations, in interfering with the growth of gas-hydrate crystals. WO94/12761, published Jun. 9, 1994, discloses other additives for inhibiting crystal growth and controlling the formation of gas hydrates in fluid mixtures such as those encountered in the hydrocarbon industry in the production, transportation, and processing of petroleum and natural gas fluids. It has also been disclosed that certain polyglycol diamines prevent blockage of gas transmission lines with gas hydrates. These amines have the following general structure: $H_2NCHRCH_2(OCH_2CHR)_nNH_2$ where R=H or $CH_3$ and n=2 to 6.

However, compositions and methods known in the art are only partially effective in preventing the formation of gas hydrates. When applied to conditions that strongly favor hydrate formation, prior art compositions and methods lose their effectiveness, to the point that they are not a practical solution to the hydrate problem.

The compositions and methods of the present invention are advantageous and more desirable than those of the prior art in that they are more effective at lower concentrations and at temperatures several degrees below the hydrate formation point. Moreover, they display a synergistic effect when co-applied with kinetic, polymer type, hydrate inhibitors.

SUMMARY OF THE INVENTION

The present invention relates generally to the use of ammonium salts of polyether amines as gas hydrate inhibitors. The polyether ammonium compounds of the invention have the general structure:

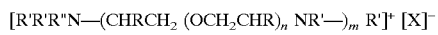

$$[R'R'R''N-(CHRCH_2(OCH_2CHR)_n NR'-)_m R']^+ [X]^-$$

where R=H or $CH_3$,

R'=H or $C_aH_{2a+1}$, where a=1 to 4;

R''=$C_bH_{2b+1}$, where b=4 to 20;

m=1 to 4;

and n=2 to 6.

Methods for inhibiting the formation and/or growth of gas hydrates in media susceptible to gas hydrate formation, particularly in the petroleum, natural gas and gas industries, are also provided. Additional objects, features, and advantages will be apparent in the written description which follows.

DETAILED DESCRIPTION OF THE INVENTION

The present invention relates to novel compositions and methods for use in inhibiting the formation and/or growth of gas hydrates in media susceptible to gas hydrate formation. According to the invention, it has been discovered that when amines of the general structure $H_2N[CHRCH_2-(OCH_2CHR)_nNH]_mH$ where R=H or $CH_3$, m=1 to 4 and n=2 to 6, and similar amines, are N-alkylated and converted to polyether ammonium salts (i.e. quaternized with alkyl halides), the compositions display more effective gas hydrate inhibition properties than those of inhibitors known in the art. The polyether ammonium compounds of the invention have the general structure:

$$[R'R''N-(CHRCH_2(OCH_2CHR)_nNR'-)_mR']^+ X]^-$$

where R=H or $CH_3$;

R'=H or $C_aH_{2a+1}$, where a=1 to 4;

R''=$C_bH_{2b+1}$, where b=4 to 20;

m=1 to 4;

and n=2 to 6.

The polyether ammonium compounds inhibit gas hydrate formation by coating and commingling with hydrate crystals, thereby interfering with agglomeration of small particles into large ones which would result in plugging subterranean formations, as well as gas pipelines and equipment. The polyether ammonium compounds tend to concentrate at the water/hydrocarbon interface, the spot where gas hydrates usually form first because the quaternization of amine molecules provides added surface activity. The compounds are also useful in preventing growth of gas hydrates that are already formed.

The present invention is useful in any fluid mixture wherein gas hydrates can form, and finds particular utility in the control of gas hydrate formation that may occur during the extraction of natural gas and petroleum fluids, such as low boiling hydrocarbons, from a producing well, during transportation of such gas and fluids, and during processing of such gas and fluids. The invention is particularly useful in controlling the formation of gas hydrates in fluid mixtures that comprise a gaseous phase and a liquid phase, the gaseous phase being a low boiling hydrocarbon such as a hydrocarbon containing from about 1 to 4 carbon atoms such as methane, ethane, propane, and butane. The liquid phase comprises a mixture of water and liquid hydrocarbons of from about 3 to 7 carbon atoms such as propane, butanes, pentanes, hexanes, and heptanes. Thus, the invention relates to methods for inhibiting the formation, growth and/or agglomeration of gas hydrate crystals in a mixture containing low boiling hydrocarbons in water.

The compositions of the present invention are polyether ammonium compounds of the general formula:

where $R=H$ or $CH_3$;

$R'=H$ or $C_aH_{2a+1}$, where $a=1$ to 4;

$R''=C_bH_{2b+1}$, where $b=4$ to 20;

$m=1$ to 4;

and $n=2$ to 6.

Generally, the anion $[X]^-$ may be substituted freely. In a preferred embodiment, $X=Cl, Br, I, SO_4^-, OH,$ or $CH_3COO$. In a more preferred embodiment, $X=Cl, Br,$ or $I$.

In another preferred embodiment, the polyether ammonium compound comprises:

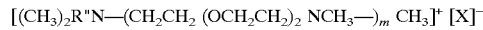

where $R''=C_bH_{2b+1}$, where $b=4$ to 16;

and $m=1$ to 4 $X$ is the same as described above.

In a more preferred embodiment, the polyether ammonium compound comprises

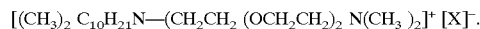

In yet another embodiment, the gas hydrate inhibitors of the invention may also comprise polymeric kinetic gas hydrate inhibitors such as polyvinylpyrrolidone (PVP), polyvinylcaprolactam (PVCap), or a polyvinylpyrrolidone caprolactam dimethylaminoethylmethacrylate copolymer such as "VC 713"which is commercially available from International Specialty Products (ISP) of Wayne, N.J. In a preferred embodiment, the kinetic gas hydrate inhibitor comprises polyvinylcaprolactam.

In performing the methods of the present invention, an effective amount of a polyether ammonium compound having the general formula:

where $R=H$ or $CH_3$;

$R'=H$ or $C_aH_{2a+1}$, where $a=1$ to 4;

$R''=C_bH_{2b+1}$, where $b=4$ to 20;

$m=1$ to 4;

and $n=2$ to 6 is admixed with a fluid mixture which contains water and at least one guest substance in order to inhibit the formation and/or growth of gas hydrates in the fluid mixture or in a pipe containing a petroleum fluid stream having hydrate forming constituents. Any of the polyether ammonium compounds described above may be used in performing the methods of the invention. Moreover, kinetic gas hydrate inhibitors may be admixed with the polyether ammonium compounds.

The fluid mixtures that can be treated in accordance with the methods of the present invention include any fluid or fluids comprising water and guest molecules, where water and guest molecules together can form clathrate hydrates. The fluid mixture may comprise any combination of one or more gaseous phase, aqueous liquid phase, and organic liquid phase, and in any and all proportions. Typically, the fluid mixture will comprise at least two fluid phases—a gaseous phase, which comprises guest molecules, and an aqueous liquid phase. Generally, a suitable fluid mixture will comprise an organic liquid phase as well as a gaseous phase and an aqueous liquid phase.

The polyether ammonium compounds of the present invention can be added to the fluid mixture in a variety of ways known in the art—the sole requirement is that the polyether ammonium compound(s), with or without a kinetic gas hydrate inhibitor, be sufficiently incorporated into the fluid mixture to control the hydrate formation. For example, the polyether ammonium compound may be injected into a downhole location in a producing well to control hydrate formation in fluids being produced through the well. Likewise, the polyether ammonium compound may be injected into the produced fluid stream at a wellhead location, or even into piping extending through a riser, through which produced fluids are transported in offshore producing operations from the ocean floor to the offshore producing facility located at or above the surface of the water. Additionally, the polyether ammonium compound may be injected into a fluid mixture prior to the transportation of the fluid mixture, such as via a subsea pipeline from an offshore producing location to an onshore gathering and/or processing facility.

Incorporation or admixing of the polyether ammonium compound into the fluid mixture may be aided by mechanical means known in the art, including but not limited to static in-line mixers on a pipeline or an atomizing injection. In most pipeline transportation applications, however, sufficient mixture and contacting will occur due to the turbulent nature of the fluid flow, and mechanical mixing aids may not be necessary.

Generally, the polyether ammonium compound will be admixed with the fluid mixture in an amount of from about 0.01% to about 5% by weight of the water present in the fluid mixture, preferably from about 0.05% to about 1% by weight of the water present in the fluid mixture, and more preferably in an amount of from about 0.025% to about 0.5% by weight of the water present in the fluid mixture. However, the amount of polyether ammonium compound required to be admixed with any particular fluid mixture may vary, depending upon the composition of the fluid mixture, as well as the temperature and pressure of the fluid mixture system. Knowing such parameters, an effective amount of polyether ammonium compound can be determined by methods known in the art.

For example, the subcooling temperature, i.e. the temperature at which gas hydrates begin to form, can be determined using commercially available computer programs such as those available from the Colorado School of Mines in Denver, Colo., or from CALSEP A/S in Denmark. The differential between the fluid mixture system's temperature and the subcooling temperature at a given pressure can then be determined. With this information, the operator can estimate whether to increase or decrease the general recommended dosage of gas hydrate inhibitor for a fluid mixture of a given composition. Alternatively, an effective amount of inhibitor can be determined as compared to the amount of methanol that would be required to protect a fluid mixture system against gas hydrate formation. Typically, methanol is added in an amount of between 20% and 30% of the water volume of a given fluid mixture system. This amount may vary, however, depending on the composition, temperature, and pressure parameters of the fluid mixture system. The gas hydrate inhibitors of the present application are generally effective in amounts of from about $\frac{1}{100}$ to about $\frac{1}{1000}$ of the methanol required to treat a given fluid mixture system.

The following examples are intended to illustrate the present invention and in no way limit or restrict its scope.

EXAMPLE 1

Amine Quaternization

Seven quaternary salt products (Compounds A–G) were prepared using the polyether amines and alkyl bromides shown in Table 1. Polyether amine (0.21M) was warmed up to 75° C. and stirred in a round bottom flask. Alkyl bromide (0.2 M) was added dropwise to the amine over 1.5 hours. During the bromide addition, the temperature of the reaction mixture was allowed to increase to 90° C. After the bromide addition was complete, the reaction mixture was stirred for two more hours at 90° C. Ammonium salts or quaternary bromides made this way are mostly amber viscous liquids. Results are shown in Table 1. The effectiveness of the compounds as gas hydrate inhibitors is described in Example 2.

TABLE 1

| Polyether Amine | Alkyl Bromide | Product Appearance | Quaternary Salt Product |
|---|---|---|---|
| Tri-n-butyl amine | Hexadecyl bromide | White crystalline solid | Compound A |
| "JEFFAMINE D-230"[1] | Hexadecyl bromide | Yellow paste | Compound B |
| "JEFFAMINE D-230" | Dodecyl bromide | Amber viscous liquid | Compound C |
| "JEFFAMINE D-230" | Decyl bromide | Amber viscous liquid | Compound D |
| "JEFFAMINE XTJ-504"[2] | Dodecyl bromide | Amber viscous liquid | Compound E |
| "JEFFCAT E-40"[3] | Dodecyl bromide | Yellow solid | Compound F |

TABLE 1-continued

| Polyether Amine | Alkyl Bromide | Product Appearance | Quaternary Salt Product |
|---|---|---|---|
| "JEFFAMINE XTJ-512"[4] | Decyl bromide | Amber viscous liquid | Compound G |

[1] Poly(oxy(methyl-1,2-ethanediyl)),alpha-(2-aminomethylethyl) omega-(2-aminoethylethoxy),$H_2NCH(CH_3)CH_2-[OCH_2CH(CH_3)]_xNH_2$ where $x$ = 2.6
[2] 2,2'-(1,2-ethanediylbis-(oxy))bisethaneamine,$H_2N(CH_2)_2[OCH_2CH_2)_2NH_2$
[3] 2,2'-(1,2-ethanediylbis-(oxy))bis-(N,N-dimethyl)ethaneamine,$Me_2N(CH_2)_2[OCH_2CH_2)_2 NMe_2$
[4] 2,2'-(1,2-ethanediylbis-(oxy))bisethanol reacted with ammonia, $H_2N-(CH_2CH_2OCH_2CH_2OCH_2CH_2NH)_nH$ where $n$ = 1–4

"JEFFAMINE D-230", "JEFFAMINE XTJ-504", "JEFFAMINE XTJ-512" and "JEFFCAT E-40" are commercially available from Huntsman Corporation, Salt Lake City, Utah.

EXAMPLE 2

Testing Efficiency of Hydrate Inhibitors

An accelerated gas hydrate simulation test was conducted to test the efficiency of the Compounds A–G as gas hydrate inhibitors. The test apparatus consisted of a 20-m long 1-mm ID stainless steel tubing coil immersed in a temperature controlled cooling bath filled with an ethylene glycol/water mixture. The last section of the coil placed outside the cooling bath consisted of a short ( m) 0.05 mm ID stainless steel tubing. This tubing reduced the fluid flow to 2.4 ml/h at a constant feeding pressure 0.1 atm.

A solution of 20% tetrahydrofuran (THF) in 3.5% NaCl/water mixed with a test product (see Table 2) was pumped through the simulated pipeline at preset temperatures of –8 to –15° C. The THF/salt water solution simulates gas/water systems. Concentrations of hydrate inhibitor test products were 0.1 to 0.5% active. The volume of fluid inside the loop was 60 ml and allowed a 25-hr fluid residence time inside the cooled section of the coil at a flow volume of 0.04 ml/min. The flow volume through the simulated gas pipeline was monitored and recorded with time. A 10-micron filter located at the coil intake assured that a flow stop did not occur from plugging the line with impurities, and was caused only by blockage with hydrate crystals being formed in the simulated gas line cooled inside the bath. The coil was warmed up to 60° C. and washed with water and the next test fluid after completion of each test.

In each experiment the fluid flow time was measured from the beginning of flow until the stoppage of flow as a result of complete coil plugging. The freeze times (hours or "h") shown in Table 2 are the average of five runs each.

TABLE 2

| | | Flow Time (h) @ Test Temperature (° C.) | | | | | | | |
|---|---|---|---|---|---|---|---|---|---|
| Test Product | Active % | –8° | –9° | –10° | –11° | –12° | –13° | –14° | –15° |
| No Additive | | 11 h | 2 h | 1.5 h | 0.5 | 0.1 h | | | |
| Bu$_4$NBr | 0.5% | | | 4.5 h | 2.5 h | | | | |
| Bu$_4$NBr | 1.0% | | 39 h | 7 h | 4 h | 1 h | | | |
| Bu$_3$C$_{16}$H$_{31}$NBr | 0.5% | | | >24 h | | 10 h | | | |
| Bu$_3$C$_{14}$H$_{29}$PCl | 0.5% | | | >24 h | | 12 h | | 5 h | 0.1 h |
| "JEFFAMINE D-230" | 0.5% | | >24 h | 13.3 h | | 0.5 h | | | |
| Compound B | 0.5% | | | | | >24 h | | >24 h | 11 h |
| Compound B | 0.1% | | >24 h | 3.3 h | | 1 h | | | |
| Compound C | 0.5% | | | | | | >24 h | >24 h | >24 h |
| Compound C | 0.1% | | | | | | 4 h | | 1 h |
| Compound D | 0.5% | | | | | 20 h | 3 h | 3 h | 3 h |

TABLE 2-continued

| Test Product | Active % | -8° | -9° | -10° | -11° | -12° | -13° | -14° | -15° |
|---|---|---|---|---|---|---|---|---|---|
| Compound E | 0.5% | | | | | | | >24 h | >24 h |
| Compound E | 0.1% | | | | | | | 27 h | 16 h |
| "JEFFAMINE XTJ-504" | 0.5% | | >24 h | | | 1.3 h | | | |
| "JEFFCAT E-40" | 0.5% | | | | | | | >24 h | 19 h |
| Compound F | 0.5% | | | | | | >24 h | >24 h | >24 h |
| Compound F | 0.1% | | | | | | 24 h | 23 h | 1.5 h |
| "JEFFAMINE XTJ-512" | 0.5% | | | | | | | >24 h | >24 h |
| Compound G | 0.5% | | | | | | | >24 h | >24 h |
| Polyvinylcaprolactam | 0.5% | | | >24 h | | 23 h | | 9 h | |
| PVCap + Compound C | 0.25% 0.25% | | | | | | | >48 h | >24 h |
| PVCap + Compound C | 0.05% 0.05% | | | | | | | 27 h | 23 h |

As can be seen from the data in the Table 2, the salts of polyether ammonium compounds provide a superior method of inhibiting gas hydrate formation as compared to simple ammonium and phosphonium quaternary compounds and starting amines by themselves. Moreover, these newly produced compounds display a synergistic effect when applied in admixture with a polymeric kinetic hydrate inhibitor such as polyvinylcaprolactam (PVCap). For example, a mixture of 0.05% PVCap and 0.05% Compound C (last row of Table 2) provides greater hydrate inhibition than each of Compounds B, C, E, and F (applied separately) at a concentration of 0.1%.

What is claimed is:

1. A method for inhibiting the formation or growth of gas hydrates in a fluid mixture, comprising admixing polyether ammonium compound having the formula $$[R'R'R''N—(CHRCH_2 (OCH_2CHR)_n NR'—)_m R']^+ [X]^-$$

where R=H or $CH_3$;
R'=H or $C_aH_{2a+1}$, where a=1 to 4;
R"=$C_bH_{2b+1}$, where b=4 to 20;
X=Cl, Br, I, $SO_4^-$, OH, or $CH_3COO$;
m=1 to 4;
and n=2 to 6 with said fluid mixture, whereby said polyether ammonium compound is present in an amount which interferes with the formation or growth of gas hydrates in said fluid mixture.

2. The method of claim 1, wherein said polyether ammonium compound comprises $$[(CH_3)_2R''N—(CH_2CH_2 (OCH_2CH_2)_2 NCH_3—)_m CH_3]^+ [X]^-$$

where R"=$C_bH_{2b+1}$, where b=4 to 16;
and m=1 to 4.

3. The method of claim 1, wherein said polyether ammonium compound comprises $$[(CH_3)_2 C_{10}H_{21}N—(CH_2CH_2 (OCH_2CH_2)_2 N(CH_3)_2]^+ [Br]^-.$$

4. The method of claim 1, wherein said polyether ammonium compound is admixed with said fluid mixture in an amount of about 0.01 to about 5% by weight of water present in said fluid mixture.

5. The method of claim 1, wherein said polyether ammonium compound is admixed with said fluid mixture in an amount of about 0.05 to about 1% by weight of water present in said fluid mixture.

6. The method of claim 1, wherein said polyether ammonium compound is admixed with a kinetic gas hydrate inhibitor.

7. A method for inhibiting the formation or growth of gas hydrates in a pipe containing a petroleum fluid stream having hydrate forming constituents, comprising admixing a polyether ammonium compound of the formula:

$$[R'R'R''N—(CHRCH_2 (OCH_2CHR)_n NR'—)_m R']^+ [X]^-$$

where R=H or $CH_3$;
R'=H or $C_aH_{2a+1}$, where a=1 to 4;
R"=$C_bH_{2b+1}$, where b=4 to 20;
X=Cl, Br, I, $SO_4^-$, OH, or $CH_3COO$;
m=1 to 4;
and n=2 to 6 with said petroleum fluid stream, whereby said polyether ammonium compound is present in an amount which interferes with the formation or growth of gas hydrates in said fluid stream.

8. The method of claim 7, wherein said polyether ammonium compound comprises $$[(CH_3)_2R''N—(CH_2CH_2 (OCH_2CH_2)_2 NCH_3—)_m {}_{CH3}]^+ [X]^-$$

where R"=$C_bH_{2b+1}$, where b=4 to 16;
and m=1 to 4.

9. The method of claim 7, wherein said polyether ammonium compound comprises $$[(CH_3)_2 C_{10}H_{21}N—(CH_2CH_2 (OCH_2CH_2)_2 N(CH_3)_2]^+ [Br]^-.$$

10. The method of claim 7, wherein said polyether ammonium compound is admixed with said petroleum fluid stream in an amount of about 0.01 to about 5% by weight of water present in said fluid stream.

11. The method of claim 7, wherein said polyether ammonium compound is admixed with said petroleum fluid stream in an amount of about 0.05 to about 1% by weight of water present in said fluid stream.

12. The method of claim 7, wherein said polyether ammonium compound is admixed with a kinetic gas hydrate inhibitor.

* * * * *

UNITED STATES PATENT AND TRADEMARK OFFICE
CERTIFICATE OF CORRECTION

PATENT NO. : 6,025,302
DATED : February 15, 2000
INVENTOR(S) : Marek K. Pakulski It is certified that error appears in the above-identified patent and that said Letters Patent is hereby corrected as shown below:

Column 7,
Line 35, insert the word -- a -- after the word "admixing" and before the word "polyether".
Line 57, delete "$[(CH_3)_2C_{10}H_{21}N\text{-}(CH_2CH_2(OCH_2CH_2)_2N(CH_3)_2]^{+[Br]\text{-}}$" and insert -- $[(CH_3)_2C_{10}H_{21}NCH_2CH_2(OCH_2CH_2)_2N(CH_3)_2]^+[Br]^-$ --.

Column 8,
Line 44, delete "$[(CH_3)_2R"N\text{—}(CH_2CH_2(OCH_2CH_2)_2\ NCH_3\text{—})_{m\ CH3}]^+\ [X]^-$" and insert -- $[(CH_3)_2R"N\text{-}(CH_2CH_2(OCH_2CH_2)_2NCH_3\text{-})_mCH_3]^+[X]^-$ --.
Line 51, delete "$[(CH_3)_2C_{10}H_{21}N\text{—}(CH_2CH_2\ (OCH_2CH_2)_2\ N(CH_3)_2]^+\ [Br]^-$" and insert -- $[(CH_3)_2C_{10}H_{21}NCH_2CH_2(OCH_2CH_2)_2N(CH_3)_2]^+[Br]^-$ --.

Signed and Sealed this

Tenth Day of May, 2005

JON W. DUDAS
*Director of the United States Patent and Trademark Office*